United States Patent
Garcia-Herreros et al.

(10) Patent No.: US 11,283,198 B2
(45) Date of Patent: Mar. 22, 2022

(54) CABLE SHIELD CONNECTING ASSEMBLY FOR ELECTRICAL DEVICE

(71) Applicant: ETEL S.A., Môtiers (CH)

(72) Inventors: Iván Garcia-Herreros, St-Sulpice (CH); Dmitry Chechenev, Neuchâtel (CH)

(73) Assignee: ETEL S.A., Môtiers (CH)

( * ) Notice: Subject to any disclaimer, the term of this patent is extended or adjusted under 35 U.S.C. 154(b) by 97 days.

(21) Appl. No.: 17/003,293

(22) Filed: Aug. 26, 2020

(65) Prior Publication Data
US 2021/0066822 A1   Mar. 4, 2021

(30) Foreign Application Priority Data
Aug. 28, 2019   (EP) .................... 19194135

(51) Int. Cl.
*H01R 4/28* (2006.01)
*H01R 4/64* (2006.01)
*H01R 43/00* (2006.01)
*H02G 15/013* (2006.01)
*H02K 5/22* (2006.01)

(52) U.S. Cl.
CPC ............... *H01R 4/28* (2013.01); *H01R 4/64* (2013.01); *H01R 43/00* (2013.01); *H02G 15/013* (2013.01); *H02K 5/225* (2013.01); *H01R 2201/10* (2013.01)

(58) Field of Classification Search
CPC .. H01R 4/646; H01R 13/6593; H01R 9/0527; H01R 13/65912; H01R 9/0518; H01R 9/0524; H01R 13/5205; H01R 9/0512; H01R 13/6592; H01R 13/648; H01R 13/6582; H01R 4/64; H01R 13/6583; H01R 13/6584; H01R 13/6596; H01R 11/12;
(Continued)

(56) References Cited

U.S. PATENT DOCUMENTS 3,646,496 A   2/1972   Williams
4,515,991 A   5/1985   Hutchison
(Continued)

FOREIGN PATENT DOCUMENTS

CA   1179029 A    12/1984
DE   19701959 C1   8/1998
(Continued)

*Primary Examiner* — Edwin A. Leon
*Assistant Examiner* — Matthew T Dzierzynski
(74) *Attorney, Agent, or Firm* — Carter, Deluca & Farrell LLP

(57) ABSTRACT

A cable shield connecting assembly is arranged to secure and ground a cable to the housing of an electrical device. The cable includes a cable jacket and braided shielding extending from an end portion of the cable jacket. The cable shield connecting assembly includes: a mounting plate having a cavity and an aperture arranged on a bottom side of the cavity; and a grommet having an inner diameter inside which the end portion of the cable jacket is fitted, and upper and lower portions extending on both sides of an edge of the aperture of the mounting plate. The upper portion of the grommet is fitted inside the cavity. The cable shield connecting assembly further includes a clamp pressed-fitted against the upper portion of the grommet inside the cavity to squeeze therebetween the braided shielding.

23 Claims, 2 Drawing Sheets

(58) Field of Classification Search
CPC ............... H01R 13/65914; H01R 4/66; H01R 2201/26; H01R 12/596
USPC ....... 439/98, 607.52, 607.41, 587, 567, 497, 439/462, 451, 274; 174/750, 650, 152 G, 174/153 G, 359, 89, 151, 167, 360
See application file for complete search history.

(56) References Cited

U.S. PATENT DOCUMENTS

| | | | | |
|---|---|---|---|---|
| 4,547,623 | A * | 10/1985 | Van Brunt | H01R 4/646 174/359 |
| 4,896,000 | A * | 1/1990 | Procter | H02G 15/04 174/74 R |
| 4,905,940 | A * | 3/1990 | Luka | F16L 5/10 16/2.1 |
| 5,083,929 | A * | 1/1992 | Dalton | H01R 9/0524 174/359 |
| 5,145,216 | A * | 9/1992 | Valls, Jr. | F16L 41/004 285/140.1 |
| 5,170,008 | A | 12/1992 | Evans et al. | |
| 5,635,678 | A * | 6/1997 | Yasukuni | H02G 3/088 156/48 |
| 5,981,877 | A * | 11/1999 | Sakata | B60R 16/0222 174/153 G |
| 6,264,505 | B1 * | 7/2001 | Clary | H05K 9/0018 174/151 |
| 6,335,482 | B1 * | 1/2002 | Mason | H01R 9/05 174/359 |
| 6,376,766 | B1 * | 4/2002 | Bartholoma | H01R 13/5816 174/354 |
| 7,347,730 | B2 * | 3/2008 | Kameyama | H01R 13/5205 439/587 |
| 8,502,079 | B2 * | 8/2013 | Shitamichi | B60R 16/0222 174/152 G |
| 9,343,821 | B2 * | 5/2016 | Fuzioka | H01B 7/2825 |
| 9,693,491 | B2 * | 6/2017 | Yanagihara | H01R 13/65914 |
| 9,793,692 | B1 * | 10/2017 | Pogash | H01B 17/583 |
| 10,272,855 | B2 * | 4/2019 | Yabashi | F16L 5/10 |
| 2003/0034165 | A1 * | 2/2003 | Brehm | H01R 13/6599 174/359 |

FOREIGN PATENT DOCUMENTS

| | | |
|---|---|---|
| EP | 0203263 B1 | 4/1992 |
| GB | 2346742 A | 8/2000 |

* cited by examiner

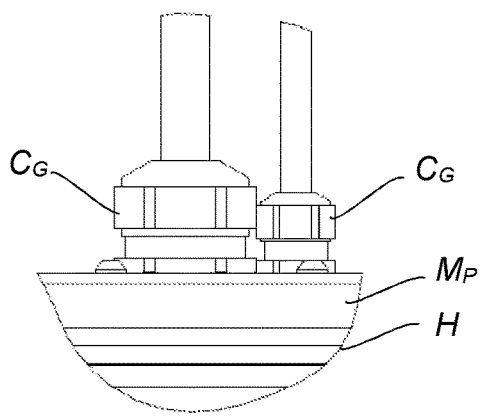
Fig. 1 – *Prior art*
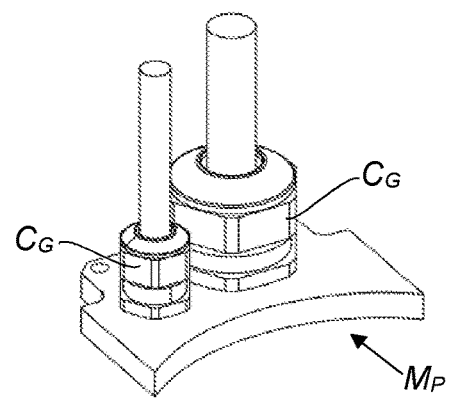
Fig. 2 – *Prior art*
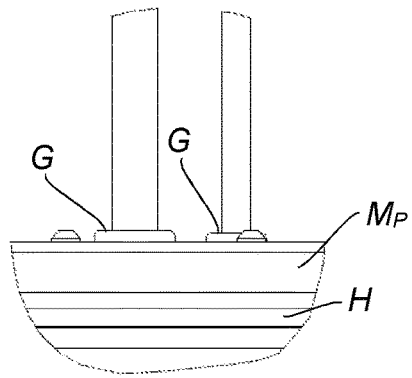
Fig. 3 – *Prior art*
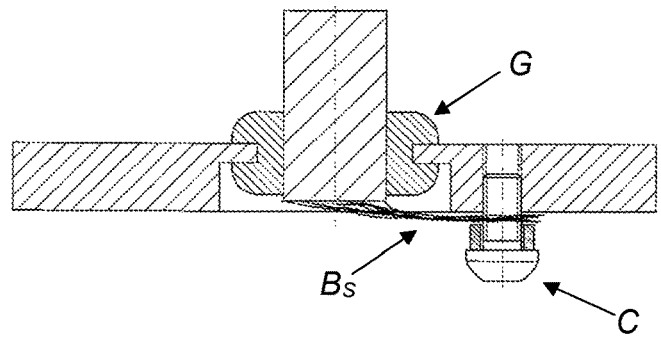
Fig. 4 – *Prior art*
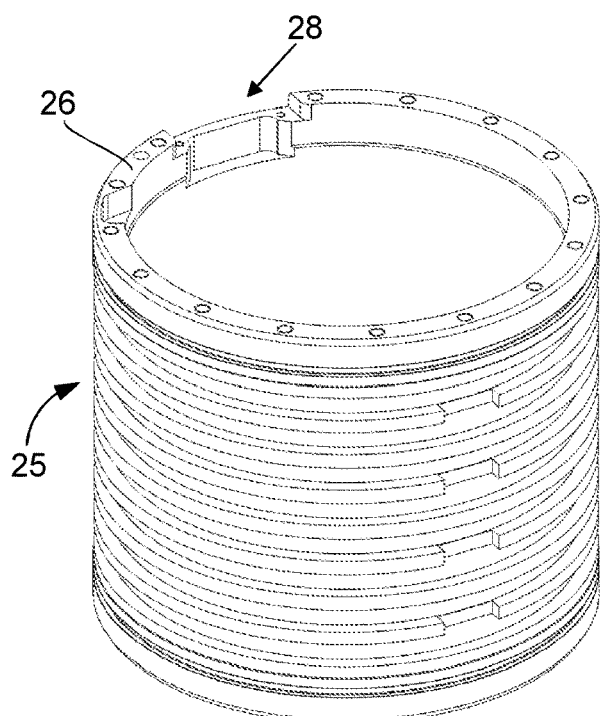
Fig. 5

CABLE SHIELD CONNECTING ASSEMBLY FOR ELECTRICAL DEVICE

CROSS-REFERENCE TO RELATED APPLICATIONS

The present application claims priority to Application No. 19194135.0, filed in the European Patent Office on Aug. 28, 2019, which is expressly incorporated herein in its entirety by reference thereto.

FIELD OF THE INVENTION

The present invention relates to a cable shield connecting assembly for an electrical device. For example, the present invention relates to a cable shield connecting assembly for securing and grounding cables to the housing of an electrical device and, more particularly, for securing and grounding motor cables to the housing of an electric rotary motor. The present invention also relates to a method for securing and grounding motor cables to the housing of an electric rotary motor.

BACKGROUND INFORMATION

Cables are conventionally connected to the housing of electrical devices using cable glands of the type shown in FIG. 1 and described, for example, in European Patent No. 0 203 263, Canadian Patent No. 1 179 029, and U.S. Pat. No. 4,515,991. Cable glands $C_G$ not only provide mechanical assembly of the cables to the housing of electrical devices but can also be used for cable shield grounding to the housing H of the electrical devices. However, in electric rotary motors for example, cable glands are screwed to a mounting plate $M_P$ that is fixed in a cut-out portion 28 provided on an upper ring 26 of a cylindrical housing 25 as shown in FIG. 5. The mounting plate $M_P$ requires a certain thickness to ensure a robust connection with the cable glands. In addition, shielding the cable through a cable gland is a rather laborious operation since the braided shielding must be adjusted and fixed inside the cable gland and excess braided shielding must be cut manually thereafter. Moreover, cable glands are expensive.

Grommets of the type shown in FIG. 3 and described, for example, in U.S. Pat. No. 4,905,940 and German Published Patent Application No. 197 01 959 are used to mitigate the above disadvantages of the cable glands as they offer a more compact solution at a reduced cost. Grommets G are also assembled to a mounting plate $M_P$ that is fixed in the cut-out portion 28 of the upper ring 26 of the electric motor housing 25 of FIG. 5.

However, as shown in FIG. 4, braided shielding needs to be grounded somehow to the housing H of the electric rotary motor for electrical safety as the grommet G is made of insulating material. A clamp shielding fixation is therefore required, whereby a clamp C is screwed against a side of the mounting plate $M_P$ to squeeze therebetween braided shielding $B_S$ to ensure proper grounding of the cables. The clamp shielding fixation protrudes downwardly inside the motor housing once the mounting plate $M_P$ is fixed in the cut-out portion 28 of the electric motor housing 25. This protruding part is detrimental to the size of the motor, since a minimum distance between adjacent metal portions within the housing is required for electrical safety reasons.

SUMMARY

Example embodiments of the present invention provide a cable shield connecting assembly for securing and grounding a cable to the housing of an electrical device, in particular to the housing of an electric rotary motor, which addresses the above problems.

More particularly, example embodiments of the present invention provide a cable shield connecting assembly which has a more compact configuration over the above-described cable fixations.

Example embodiments of the present invention provide a cable shield connecting assembly that is easier to assemble over the above-described cable fixations.

Example embodiments of the present invention provide a cable shield connecting assembly at a reduced cost.

Example embodiments of the present invention provide a method for securing and grounding motor cables to an electric rotary motor.

According to example embodiments of the present invention, in a cable shield connecting assembly for securing and grounding a cable to the housing of an electrical device, the includes a cable jacket and braided shielding extending from an end portion of the cable jacket, and the cable shield connecting assembly comprises includes: a mounting plate having a cavity and an aperture arranged on a bottom side of the cavity; and a grommet having an inner diameter inside which the end portion of the cable jacket is fitted, and upper and lower portions extending on both sides of an edge of the aperture of the mounting plate. The upper portion of the grommet is fitted inside the cavity. The cable shield connecting assembly further includes a clamp pressed-fitted against the upper portion of the grommet inside the cavity to squeeze therebetween the braided shielding.

The clamp may include a chamfer press-fitted against the upper portion of the grommet.

The grommet may include two radially extending flanges resting on a circular edge of the aperture.

The clamp may include or may be arranged as a washer.

The mounting plate may include a fixing portion configured to be fixed inside a cut-out portion of a cylindrical housing of an electric rotary motor and a cable receiving portion configured to extend radially inwardly inside the cylindrical housing.

According to an example embodiment of the present invention, an electric rotary motor includes a cylindrical housing having a cut-out portion inside which is mounted the mounting plate of the cable shield connecting assembly as described above.

The fixing portion of the mounting plate may be mounted inside the cut-out portion while the cable receiving portion of the mounting plate extends radially inwardly inside the cylindrical housing.

According to an example embodiment of the present invention, a method of securing and grounding a cable to a cylindrical housing of an electric rotary motor includes: securing a grommet to a mounting plate that includes a cavity and an aperture arranged on a bottom side of the cavity, an upper and a lower portion of the grommet extending on both sides of an edge of the aperture with the upper portion of the grommet fitted inside the cavity of the mounting plate; providing a cable that includes a cable jacket and braided shielding extending from an end portion of the cable jacket; adjusting the cable jacket along the inner diameter of the grommet so that the braided shielding extends inside and outside said cavity; adjusting and press-fitting a clamp inside the cavity against the upper portion of the grommet, thereby cutting the excess length of the braided shielding; and fixing the mounting plate to the cylindrical housing of the electric rotary motor.

The clamp may include or may be arranged as a washer with an outer diameter slightly larger than the diameter of the cavity.

The cylindrical housing may include an upper ring having a cut-out portion inside which is mounting a fixing portion of the mounting plate, and the mounting plate may include a cable receiving portion extending radially inwardly inside the cylindrical housing.

Further features and aspects of example embodiments of the present invention are described in more detail below with reference to the appended Figures.

BRIEF DESCRIPTION OF THE DRAWINGS

FIG. 1 is an elevation view of cable glands assembled to a mounting plate screwed on a housing ring of an electric rotary motor according to a conventional arrangement.

FIG. 2 is a perspective view of the cable glands and the mounting plate shown in FIG. 1.

FIG. 3 is an elevation view of grommets assembled to a mounting plate screwed on a cylindrical housing of an electric rotary motor according to a conventional arrangement.

FIG. 4 is a cross-sectional view of a grommet and the mounting plate shown in FIG. 3.

FIG. 5 is a perspective view of an electric motor housing including a cut-out portion on an upper side for receiving a mounting plate of a cable shield connecting assembly according to an example embodiment of the present invention.

DETAILED DESCRIPTION

Figure 6:
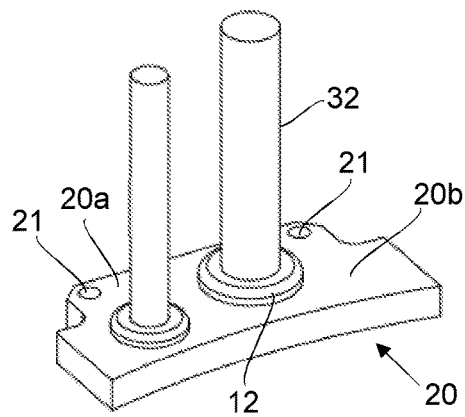
FIG. 6 is a perspective view of the cable shield connecting assembly according to an example embodiment of the present invention.
Figure 7:
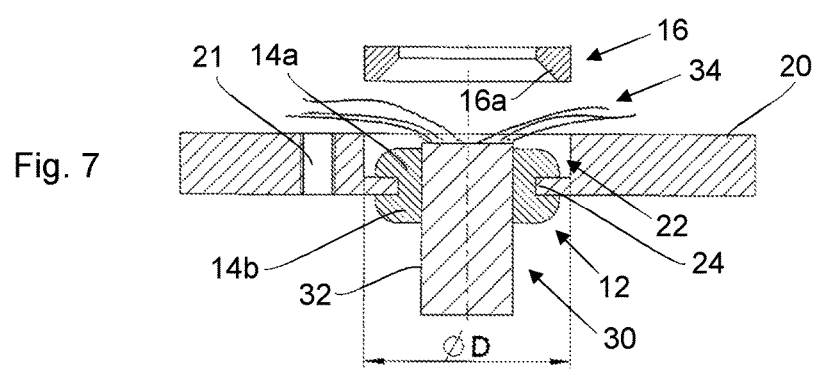
FIG. 7 is a cross-sectional view the assembly illustrated in FIG. 6 across one cavity of a mounting plate before assembly of a washer against a grommet.
Figure 8:
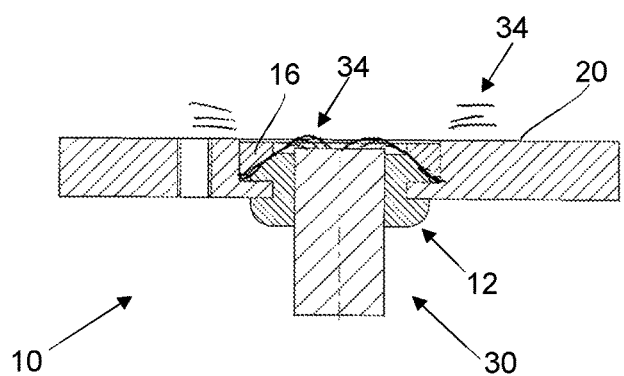
FIG. 8 is a cross-sectional view, similar to that of FIG. 7, after assembly of the washer against the grommet.
Figure 9:
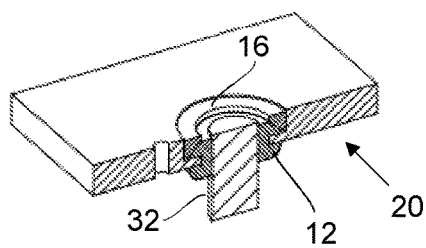
FIG. 9 is a perspective, cross-sectional view of the cable shield connecting assembly illustrated in FIG. 6, illustrating the mounting plate across one cavity.

The cable shield connecting assembly 10 as illustrated in FIGS. 6 to 9 is configured to mechanically assemble and ground a cable 30 to a mounting plate 20. The mounting plate 20 includes a fixing portion 20a having screw holes 21 and a cable receiving portion 20b having a circular cavity 22 with a circular opening 24 located on a bottom side of the circular cavity 22.

The cable 30 includes a cable jacket 32 and braided shielding 34 having inner cores extending from an end portion of the cable jacket 32. The cable shield connecting assembly 10 includes a grommet 12 having an upper and a lower portion 14a, 14b. These portions 14a, 14b are configured to extend on both sides of an edge of the circular opening 24 of the mounting plate 20 in order to secure the grommet 12 to the mounting plate 20. The upper portion 14a of the grommet 12 is fitted inside the cavity 22 of the mounting plate 20.

The grommet 12 includes an inner diameter inside which the cable jacket 32 of the cable 30 is adjusted such that the braided shielding 34 extends inside and outside the circular cavity 22 of the mounting plate 20. A clamp 16, which may be or may include, for example, a washer, is mounted inside the circular cavity 22. The outer diameter of the washer 16 is slightly larger than the diameter of the circular cavity 22, such that the washer 16 may be press-fitted inside the cavity in order to firmly fix the upper portion 14a of the grommet 12 inside the cavity.

The washer 16 includes a chamfer 16a on a portion of its inner diameter. The chamfer 16a is adapted to press against the upper portion 14a of the grommet 12 to create electrical contact with the braided shielding 34 and deform the grommet 12 to seal the cable end portion.

The outer edge of the washer 16 and the circular cavity 22 are sharp enough, so that when the washer 16 is press-fitted inside the circular cavity 22, they cut the excess length of the braided shielding 34, thereby reducing labor cost. The fixing portion 20a of the mounting plate 20 is fixed by screws inside a cut-out portion 28 provided on an upper ring 26 of a cylindrical housing 25 of an electric rotary motor as illustrated in FIG. 5. The cable receiving portion 20b extends radially inwardly inside the cylindrical housing 25 of the electric rotary motor.

The cable shield connecting assembly 10 as described above provides, for example, several advantages. For example, the cost for securing and grounding the cable end portion is reduced as the machining of additional elements, e.g., threaded holes for securing the cable end portion to the mounting plate 20, is eliminated. The washer may be made using for example a Swiss lathe, thereby reducing the cost of the washer.

In addition, the clamp C shown in FIG. 4 for grounding the cable to the mounting plate may be eliminated. Removing the clamp C inside the motor housing allows for making cabling inside the motor housing easier to perform, reducing the height of the motor, and/or adding further laminations to the motor to improve its performance.

Various modifications may be made to the cable shield connecting assembly 10 as described above without departing from the spirit and scope hereof. For example, the cavity 22 does not need to be circular and may have, for example, a square shape. In that case, the clamping function is achieved by press-fitting a clamp of a corresponding outer shape rather than using a washer.

LIST OF REFERENCE NUMERALS

10 Cable shield connecting assembly
12 Grommet
14a, 14b First and second radially extending flanges
16 Clamp
16a Chamfer
20 Mounting plate
20a Fixing portion
21 Screw holes
20b Cable receiving portion
22 Cavity
24 Aperture
25 Cylindrical housing
26 Upper ring
28 Cut-out portion
30 Electrical cable
32 Cable jacket
34 Braided shielding

What is claimed is:

1. A cable shield connecting assembly for securing and grounding a cable to a housing of an electrical device, the cable including a cable jacket and braided shielding extending from an end portion of the cable jacket, comprising:

a mounting plate having a cavity and an aperture arranged on a bottom side of the cavity;

a grommet having an inner diameter, the end portion of the cable jacket being fitted inside the inner diameter of the grommet, the grommet including upper and lower portions extending on both sides of an edge of the aperture of the mounting plate, the upper portion of the grommet being fitted inside the cavity; and a clamp pressed-fitted against the upper portion of the grommet inside the cavity and squeezing the braided shielding between the clamp and the upper portion of the grommet.

2. The cable shield connecting assembly according to claim 1, wherein the clamp includes a chamfer press-fitted against the upper portion of the grommet.

3. The cable shield connecting assembly according to claim 1, wherein the grommet includes two radially extending flanges resting on a circular edge of the aperture.

4. The cable shield connecting assembly according to claim 1, wherein the clamp includes a washer.

5. The cable shield connecting assembly according to claim 1, wherein the mounting plate includes a portion adapted to be fixed inside a cut-out portion of a cylindrical housing of an electric rotary motor and a cable-receiving portion adapted to extend radially inwardly inside the cylindrical housing.

6. The cable shield connecting assembly according to claim 4, wherein an outside diameter of the washer is slightly larger than an inside diameter of the cavity.

7. The cable shield connecting assembly according to claim 1, wherein the clamp electrically connects the braided shielding and the mounting plate.

8. The cable shield connecting assembly according to claim 4, wherein an outer edge of the washer and an edge of the cavity are adapted to cut an excess length of the braided shielding.

9. The cable shield connecting assembly according to claim 2, wherein the chamfer of the clamp is adapted to deform the grommet to seal the end portion of the cable.

10. An electric rotary motor, comprising:
a cylindrical housing having a cut-out portion;
a cable shield connecting assembly adapted to secure and ground a cable to the cylindrical housing, the cable including a cable jacket and braided shielding extending from an end portion of the cable jacket, the cable shield connecting assembly including:
a mounting plate having a cavity and an aperture arranged on a bottom side of the cavity;
a grommet having an inner diameter, the end portion of the cable jacket being fitted inside the inner diameter of the grommet, the grommet including upper and lower portions extending on both sides of an edge of the aperture of the mounting plate, the upper portion of the grommet being fitted inside the cavity; and
a clamp pressed-fitted against the upper portion of the grommet inside the cavity and squeezing the braided shielding between the clamp and the upper portion of the grommet;
wherein the mounting plate of the cable shield connecting assembly is arranged inside the cut-out portion of the cylindrical housing.

11. The electric rotary motor according to claim 10, wherein the mounting plate includes a portion mounted inside the cut-out portion of the cylindrical housing and a cable-receiving portion extending radially inwardly inside the cylindrical housing.

12. The electric rotary motor according to claim 10, wherein the clamp includes a chamfer press-fitted against the upper portion of the grommet.

13. The electric rotary motor according to claim 10, wherein the grommet includes two radially extending flanges resting on a circular edge of the aperture.

14. The electric rotary motor according to claim 10, wherein the clamp includes a washer.

15. The electric rotary motor according to claim 14, wherein an outside diameter of the washer is slightly larger than an inside diameter of the cavity.

16. The electric rotary motor according to claim 10, wherein the clamp electrically connects the braided shielding and the mounting plate, and the mounting plate is electrically connected to the cylindrical housing.

17. The electric rotary motor according to claim 14, wherein an outer edge of the washer and an edge of the cavity are adapted to cut an excess length of the braided shielding.

18. The electric rotary motor according to claim 12, wherein the chamfer of the clamp is adapted to deform the grommet to seal the end portion of the cable.

19. A method of securing and grounding a cable to a cylindrical housing of an electric rotary motor, comprising:
securing a grommet to a mounting plate that includes a cavity and an aperture arranged on a bottom side of the cavity, an upper and a lower portion of the grommet extending on both sides of an edge of the aperture, the upper portion being fitted inside the cavity of the mounting plate;
adjusting a cable jacket of a cable along an inner diameter of the grommet so that a braided shielding of the cable, which extends from an end portion of the cable jacket, extends inside and outside of the cavity;
adjusting and press-fitting a clamp inside the cavity against the upper portion of the grommet to cut an excess length of the braided shielding; and
fixing the mounting plate to the cylindrical housing of the electric rotary motor.

20. The method according to claim 19, wherein the clamp includes a washer having an outer diameter slightly larger than a diameter of the cavity.

21. The method according to claim 19, wherein the cylindrical housing includes an upper ring having a cut-out portion, a portion of the mounting plate being mounted in the cut-out portion, the mounting plate including a cable-receiving portion extending radially inwardly inside the cylindrical housing.

22. The method according to claim 19, wherein the adjusting and press-fitting the clamp includes pressing a chamfer of the clamp against the upper portion of the grommet to deform the grommet to seal the end portion of the cable.

23. The method according to claim 19, wherein the press-fitted clamp electrically connects the braided shielding and the mounting plate, and the fixing of the mounting plate to the cylindrical housing electrically connects the mounting plate to the cylindrical housing.

* * * * *